United States Patent
Erpelding

(10) Patent No.: US 7,150,094 B2
(45) Date of Patent: Dec. 19, 2006

(54) METHOD OF STIFFENING AN ACTUATOR COMB AND COIL ASSEMBLY

(75) Inventor: A. David Erpelding, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 212 days.

(21) Appl. No.: 10/875,855

(22) Filed: Jun. 24, 2004

(65) Prior Publication Data

US 2005/0283971 A1    Dec. 29, 2005

(51) Int. Cl.
*H01F 7/06* (2006.01)
*G11B 21/08* (2006.01)

(52) U.S. Cl. .......................... 29/605; 29/606; 29/603.2; 29/603.03; 29/603.23; 29/603.26; 29/737; 360/265.7

(58) Field of Classification Search ............... 29/737, 29/605, 603.03, 603.23, 603.2, 603.26, 606; 360/265.7, 266.1; 156/286, 293, 305
See application file for complete search history.

(56) References Cited

U.S. PATENT DOCUMENTS

| | | | |
|---|---|---|---|
| 5,590,002 A | | 12/1996 | Bracken et al. |
| 5,623,759 A | | 4/1997 | Thorson et al. |
| 5,691,581 A | * | 11/1997 | Umehara et al. ............. 310/13 |
| 5,812,345 A | * | 9/1998 | MacPherson et al. .... 360/256.3 |
| 5,847,903 A | * | 12/1998 | Ogawa et al. ........... 360/264.8 |
| 6,307,717 B1 | | 10/2001 | Jeong |
| 6,480,364 B1 | * | 11/2002 | Thanomsat et al. ...... 360/265.7 |
| 6,512,658 B1 | | 1/2003 | Jierapipatanakul et al. |
| 6,683,756 B1 | | 1/2004 | Zhao et al. |
| 2003/0081355 A1 | | 5/2003 | Arisaka et al. |

FOREIGN PATENT DOCUMENTS

| | | |
|---|---|---|
| JP | 63213455 | 9/1988 |
| JP | 3183348 | 8/1991 |
| JP | 2001035098 | 2/2001 |
| JP | 2003331541 | 11/2003 |

* cited by examiner

*Primary Examiner*—Minh Trinh
*Assistant Examiner*—Tai Van Nguen
(74) *Attorney, Agent, or Firm*—Bracewell & Giuliani LLP

(57) ABSTRACT

A voice coil and actuator yoke assembly is fabricated by deforming the coil to exactly fit the inner perimeter and thickness of the yoke. The comb is placed in a tool that registers the comb with the yoke against the same flat surfaces that will squash the coil. The tooling is closed and placed in an appropriate loading device and the coils are squashed to the precise thickness of the yoke. This eliminates the in-plane tolerances of the current process for bonding a coil into the yoke. The coil perimeter expands as the coil is squashed to form an intimate press fit with the yoke. A low viscosity, high $T_g$ adhesive is then applied to the coil. The low viscosity of the adhesive allows capillary action to fill the voids between the wires and bond the coil to the yoke.

20 Claims, 8 Drawing Sheets

METHOD OF STIFFENING AN ACTUATOR COMB AND COIL ASSEMBLY

BACKGROUND OF THE INVENTION

1. Technical Field

The present invention relates in general to an improved voice coil motor and, in particular, to an improved system, method, and apparatus for plastically deforming and potting the voice coil of a voice coil motor for a disk drive.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with the functional side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The motor used to rotate the disk is typically a brushless DC motor. The disk is mounted and clamped to a hub of the motor. The hub provides a disk mounting surface and a means to attach an additional part or parts to clamp the disk to the hub. In most typical motor configurations of HDDs, the rotating part of the motor (the rotor) is attached to or is an integral part of the hub. The rotor includes a ring-shaped magnet with alternating north/south poles arranged radially and a ferrous metal backing. The magnet interacts with the motor's stator by means of magnetic forces. Magnetic fields and resulting magnetic forces are induced via the electric current in the coiled wire of the motor stator. The ferrous metal backing of the rotor acts as a magnetic return path.

In prior art carriage and head stack assembly (HSA) performance, it has long been desired to stiffen the coil to improve its dynamic performance. Attempts at doing this have taken two directions. First, the coil has been cast in a plastic carrier or yoke and attached to the barrel of the comb. Drawbacks to this approach are that plastic is not the best structural material for drives requiring high dynamic performance, nor is it an effective conductor of heat for cooling the coil. This approach has found limited acceptance in the mobile drive market. Another approach has been to add a bobbin to the center of the coil. While increasing stiffness, it also increases mass, which detracts from power consumption and/or access time.

Another problem is that the coil generates heat and can reach 100° C. in server class drives and requires measures for cooling in the design of the HSA. The current method of mounting the coils for cooling is to bond the coil to the yoke with an adhesive that is filled with aluminum particulate to increase its thermal conductivity. There are a few problems with this approach. The width of the adhesive bond (about 0.5 mm) has relatively low modulus and stiffness as compared to the aluminum of the yoke. Variability in its width as well as variability in its properties, such as glass transition temperature ($T_g$), can cause variability in the dynamic performance of the HSA. In addition, variability in the homogeneity as well as the amount of aluminum particle filler will cause variability in the adhesives thermal conductivity and, consequently, variability in the power consumption or access speed of the HSA.

Moreover, the amount of adhesive required to bond the coil to the yoke is denser than an equivalent volume of coil windings. For a given carriage, this equates to about 0.2 g. Added mass either reduces the access time or increases power consumption. Furthermore, the aforementioned 0.5 mm bond line in effect positions the yoke legs outwards by this amount. This has an adverse effect on coil torsion modes.

Finally, the coil location in the z-axis of the carriage as well as planarity of the coil to the VCM magnets has associated tolerances. These tolerances exist with all coil attachment processes and can only be improved with better tooling and bonding fixtures. It is suspected that the coil not being centered or out of plane with the VCM creates coil torsion problems. Thus, an improved VCM assembly solution would be desirable.

SUMMARY OF THE INVENTION

One embodiment of a system, method, and apparatus for an improved voice coil motor is described. The principal idea behind the present invention is to fabricate the yoke and coil such that, as wound, the coil is a close fit to the inside perimeter of the yoke, and protrudes above the surface of the yoke by about 50 to 75 microns. With the coil in place in the yoke, it is squashed to fit exactly the inner perimeter and thickness of the yoke. A low viscosity, high $T_g$ adhesive is then applied to the coil. The low viscosity of the adhesive allows capillary action to fill the voids between the wires and bond the coil to the yoke. By potting the coil with a high $T_g$ adhesive, the coil becomes a structural part of the comb. By eliminating the need for a border of adhesive for attachment, the HSA is lighter with less inertia. Since the coil is pressed against the yoke, the heat transfer out of the coil is now metal-to-metal rather than through an adhesive.

The comb is placed in the tool that registers the comb with the yoke against the same flat surfaces that will squash the coil. The coil is set in place inside the yoke. The tooling is then closed and placed in an appropriate loading device such as a press or vise. The coils are squashed to the precise thickness of the yoke. This eliminates the in-plane tolerances of the current process for bonding a coil into the yoke. The coil perimeter expands as the coil is squashed to form an intimate press fit with the yoke. Experience with this procedure has shown that although the coil is free to expand inwards, the inner diameter or the coil actually expands. The back section of the coil that is unsupported by the yoke is constrained by the tooling and controls this area's final shape.

Once removed from the tool, and sitting in a free state (i.e., no fixtures), a capillary adhesive is applied to the outer surfaces of the coil. The adhesive should be chosen for low viscosity and ability to fill small voids by capillary action. The adhesive should have a high $T_g$ and be compatible with the HDD environment. It is desirable for the adhesive to provide ease of mixing and a long shelf life. In one embodiment, approximately 50 micro liters of Epo-Tek 377 was applied with a micro-pipette to each side of the coil, avoiding the region of the barrel of the comb. The comb and coil assembly is set with the coil horizontal for 1 hour. Over this period of time most of the adhesive wicks into the coil. The adhesive is cured in an oven at about 130° C. for about 40 minutes. At elevated temperature the viscosity of the adhesive further decreases, and the remainder of the adhesive wicks into the coil leaving only a shiny brown luster to the coil. This temperature is excessive for the pivot cartridge, thus, the squash and pot procedure must be done prior to installation of the pivot. The volume of adhesive is dependent on the design of the coil which determines the volume of voids between the wires. A volume of adhesive that is greater than the volume of voids between the wires assures complete filling and compensates for part-to-part variations. Excess adhesive only makes for larger fillets between the outside wire windings.

The dynamic performance of the coil of the present invention is improved over prior art designs. Additional dynamic benefits of the coil are realized when the pivot is also made stiffer. The pivot may be stiffened by, e.g., bonding the pivot into the comb through the use of a capillary acting adhesive. The bore of the comb may be fabricated to be a slip fit with the sleeve of the pivot cartridge. A low viscosity adhesive is then wicked into the microscopic space between the sleeve and the comb bore, creating a stiff adhesive joint.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
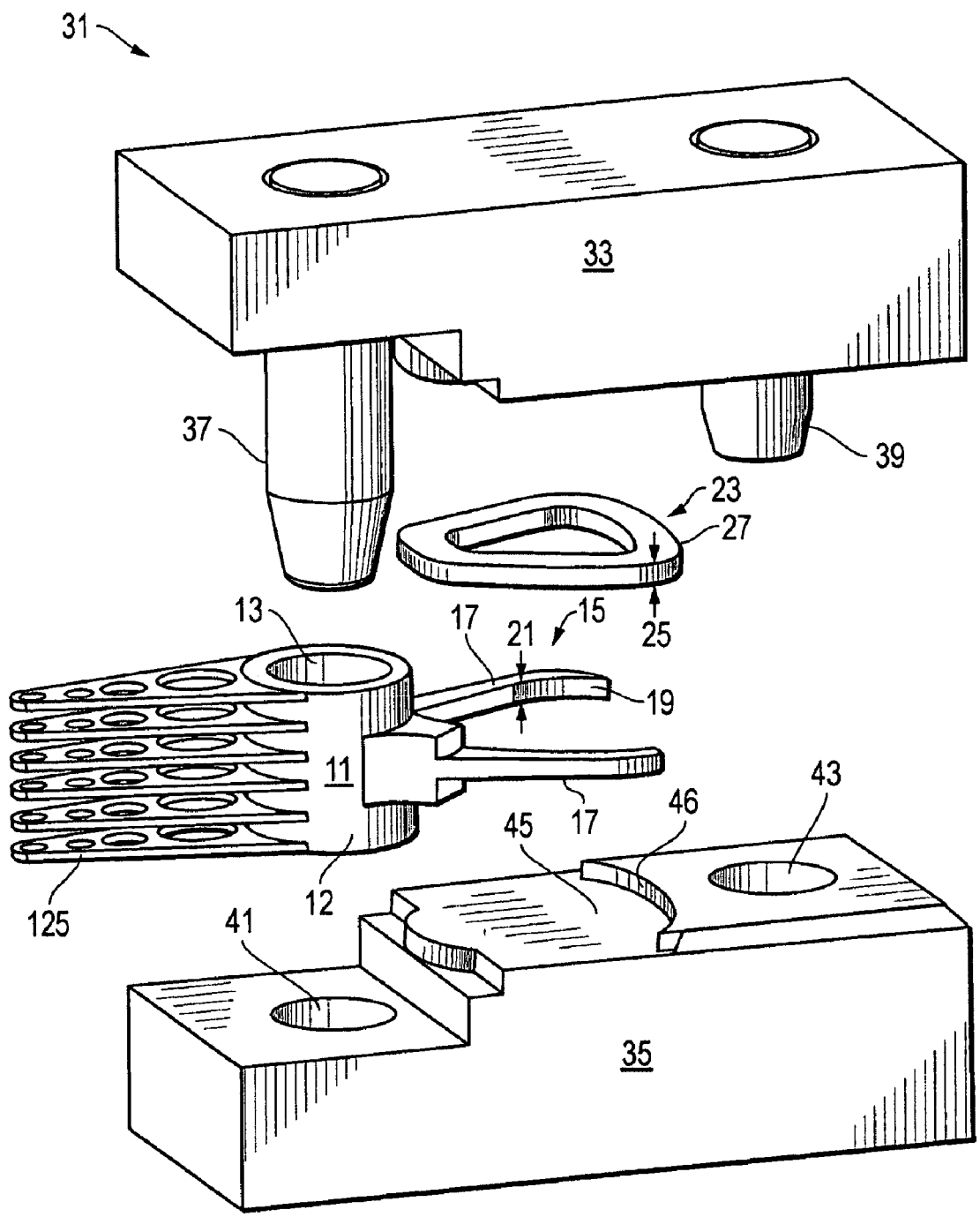
FIG. 1 is an exploded isometric view of a system for constructing a disk drive voice coil and comb assembly and is constructed in accordance with the present invention.

Referring to FIG. 1, one embodiment of a system, method, and apparatus for fabricating a voice coil motor for a data access storage device is disclosed. The present invention is ideally suited for stiffening an actuator comb and coil assembly. In one embodiment, an actuator comb 11 has a plurality of arms 125, an axial bore 13 for a pivot 123 (FIG. 10) and a yoke 15 opposite the arms 125. The yoke 15 includes a pair of legs 17 that extend from the actuator comb 11 that define an inner perimeter 19 and an axial dimension 21.

Figure 2:
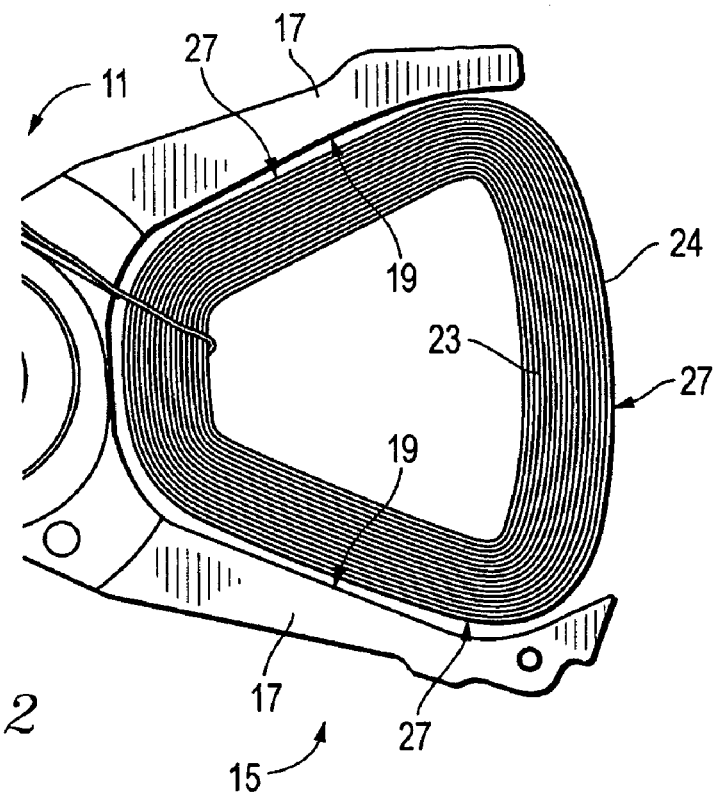
FIG. 2 is a top view of the comb and coil assembly of FIG. 1 prior to deformation.
Figure 4:
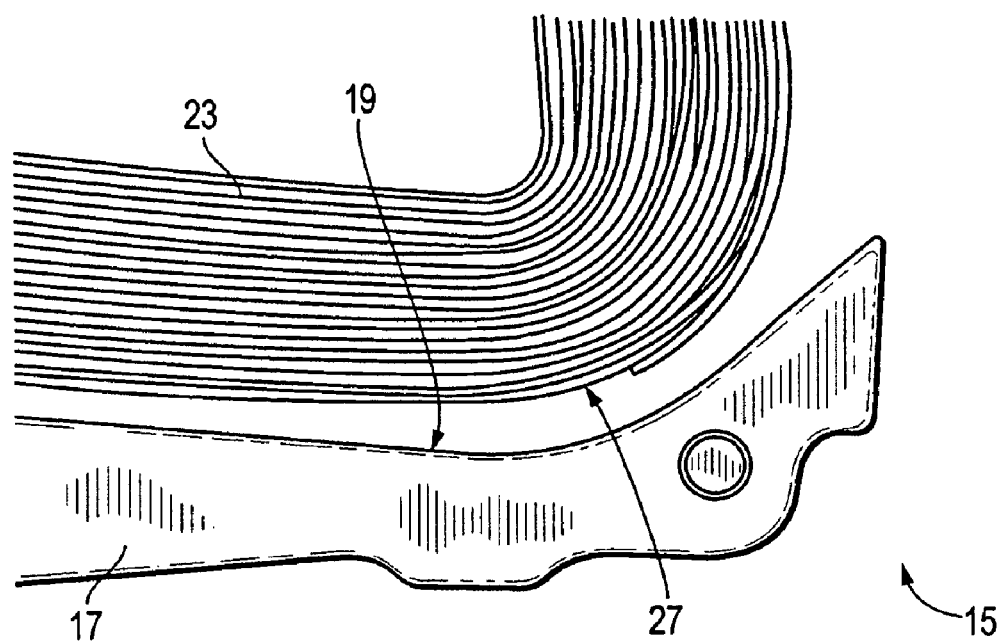
FIG. 4 is an enlarged top view of a portion of the comb and coil assembly of FIG. 2 prior to deformation.

A coil 23 forms a portion of a voice coil motor 133 (FIG. 10) and comprises a wound loop of conductive material, such as copper. The coil 23 has an axial dimension 25 and an outer perimeter 27. The axial dimension 25 of the coil 23 is greater than the axial dimension 21 of the yoke 15. The outer perimeter 27 is shaped complementary to the inner perimeter 19, and the outer perimeter 27 is sized slightly smaller than the inner perimeter 19 (FIGS. 2 and 4).

One embodiment of a block-like tool 31 used to form an assembly out of actuator comb 11 and coil 23 has a fixture 33 and a base 35 that is complementary to the fixture 33. The fixture 33 has a pair of alignment pins 37, 39 protruding therefrom. The base 35 has a pair of apertures 41, 43 that are complementary to the alignment pins 37, 39, respectively, and which receive the alignment pins 37, 39 when brought into engagement therewith. Alignment pin 37 is designed to extend through the axial bore 13 of the actuator comb 11.

The base 35 also has a seat 45 for receiving the yoke 15 and the coil 23 located in the yoke 15 between legs 17. When the fixture 33 and the base 35 are joined together, the coil 23 is plastically deformed (FIGS. 3 and 5) as it is pressed between legs 17 so that the outer perimeter 27 expands outward to the inner perimeter 19, and the axial dimension 25 of the coil 23 is decreased. In one version, the axial dimensions 25, 21 of the coil 23 and the yoke 15 are substantially equivalent after deformation. However, axial dimension 25 may still exceed axial dimension 21 after deformation (e.g., via mechanical stops to prevent further deformation.) The yoke 15 and coil 23 are loaded in the tool 31 and pressed by the fixture 33 and base 35 to deform the coil 23. A back section 24 (FIG. 3) of the coil 23 that is unsupported by the yoke 15 is constrained at wall 46 (FIG. 1) with the tool 31 to control a final shape of the coil 23.

In one embodiment, the yoke 15 and the coil 23 are fused together thereafter to form an actuator comb and coil assembly. The coil 23 may be fused by bonding to the yoke 15 with a low viscosity, high $T_g$ adhesive 51 (FIG. 5) that fills between the coil and the yoke by capillary action. The yoke 15 and coil 23 may be removed from the tool 31 before the coil 23 and the yoke 15 are fused. In one version, approximately 10 to 50 micro liters of adhesive 51 (FIG. 5) are applied to each side of the coil 23 and yoke 15 (i.e., leg 17) while avoiding, for example, a region 14 (FIG. 3) of a bore 13 of the comb to avoid contact therewith (e.g., the aluminum used to form the comb). The coil 23 and yoke 15 are set horizontal for 1 hour, and cured in an oven at about 130° C. for about 40 minutes.

In one embodiment, the coil and comb assembly (FIGS. 3 and 5) are further stiffened by a pivot 123 (FIG. 10) that is slip fit inside the bore 13 of the comb 11. An adhesive 51 that is wicked between the pivot 123 and the bore 13 form a stiff adhesive bond joint therebetween.

Figure 3:
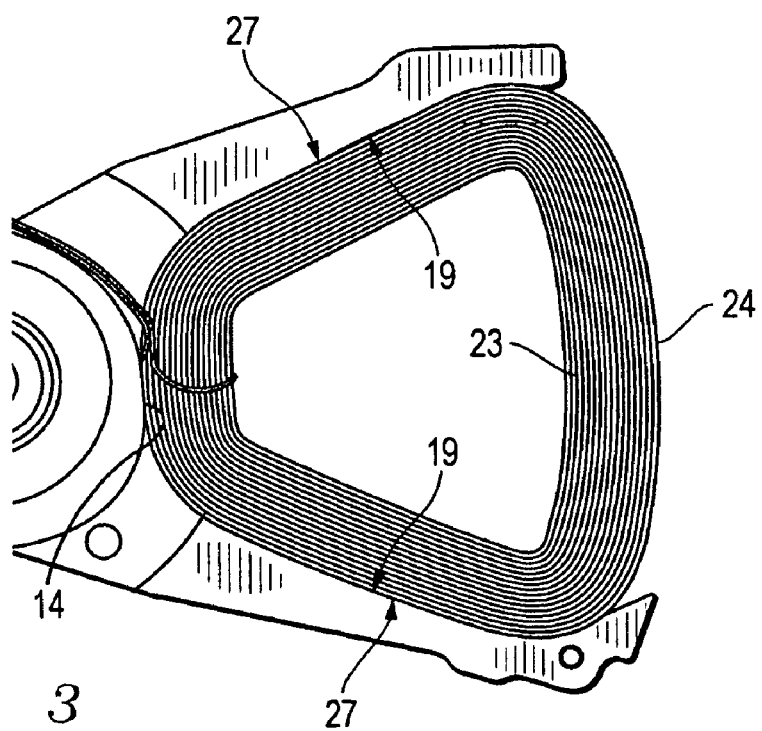
FIG. 3 is a top view of the comb and coil assembly of FIG. 1 after deformation.
Figure 5:
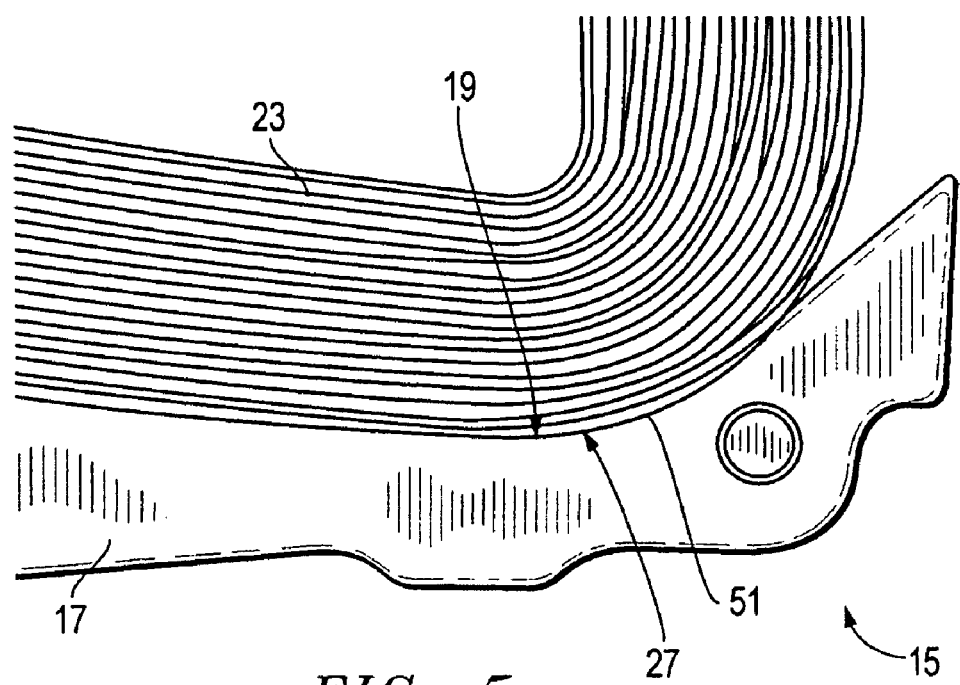
FIG. 5 is an enlarged top view of a portion of the comb and coil assembly of FIG. 3 after deformation.

The present invention also comprises a method of stiffening an actuator comb and coil assembly. One embodiment of the method comprises providing a comb 11 having a yoke 15 with an inner perimeter 19, positioning and registering a coil 23 in the yoke 15, pressing the coil 23 in place in the yoke 15 such that a perimeter 27 of the coil 23 is increased to the inner perimeter 19 and a thickness 25 of the coil 23 is decreased, and fusing the coil 23 with the yoke 15 to form a stiffened comb and coil assembly (FIGS. 3 and 5). This may include loading the yoke 15 and coil 23 in a tool 31 and then pressing the tool 31 to deform the coil 23 while constraining a back section 24 of the coil 23 that is unsupported by the yoke 15 with the tool 31 to control a final shape of the coil 23.

The method may comprise making the thickness 25 of the coil 23 substantially equivalent to the thickness 21 of the yoke 15. The method may comprise bonding the coil 23 to the yoke 15 with a low viscosity, high $T_g$ adhesive 51 that fills between the coil 23 and the yoke 15 by capillary action. This step may comprise applying approximately 50 to 100 micro liters of adhesive to each side of the coil 23 and yoke 15 while avoiding a region 14 of a bore 13 of the comb 11, setting the coil 23 and yoke 15 horizontal for 1 hour, and then curing the coil 23 and yoke 15 in an oven at about 130° C. for about 40 minutes. The method may further comprise further stiffening the coil and comb assembly by providing a pivot 123 that slip fits inside the bore 13 of the comb 11, and applying an adhesive 51 to wick between the pivot 123 and the bore 13 to form a stiff adhesive bond joint therebetween. In addition, the method may comprise providing the yoke 15 with a pair of legs 17 extending from the comb 11, positioning the coil 23 between the legs 17 of the yoke 15, and pressing the coil 23 in between the legs 17 of the yoke 15.

Figure 10:
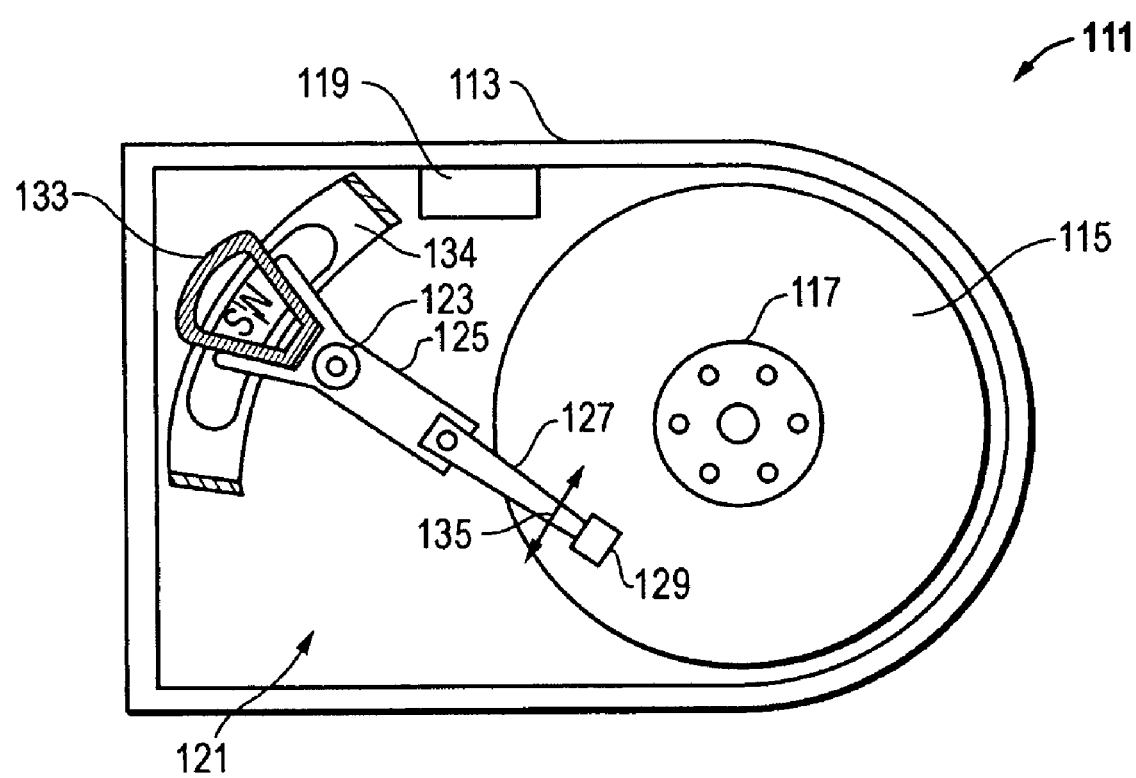
FIG. 10 is a plan view of a disk drive constructed in accordance with the present invention.

Referring now to FIG. 10, a schematic drawing of one embodiment of an information storage system comprising a magnetic hard disk file or drive 111 for a computer system is shown and is constructed in accordance with the present invention. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about the pivot assembly 123, mentioned above. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be femto size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 6:
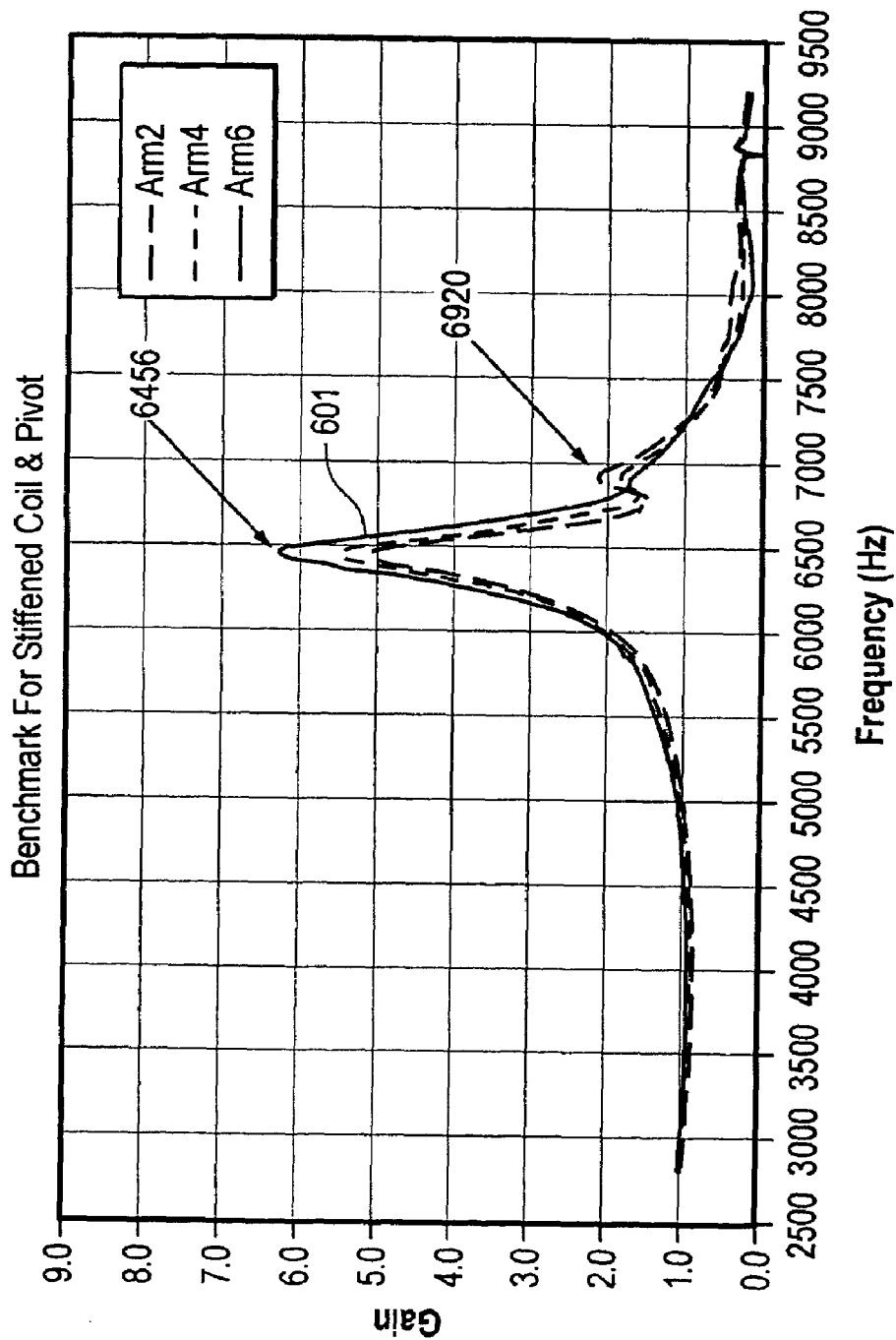
FIG. 6 is a plot of an arm stack assembly low frequency response for a conventional comb and coil assembly.
Figure 7:
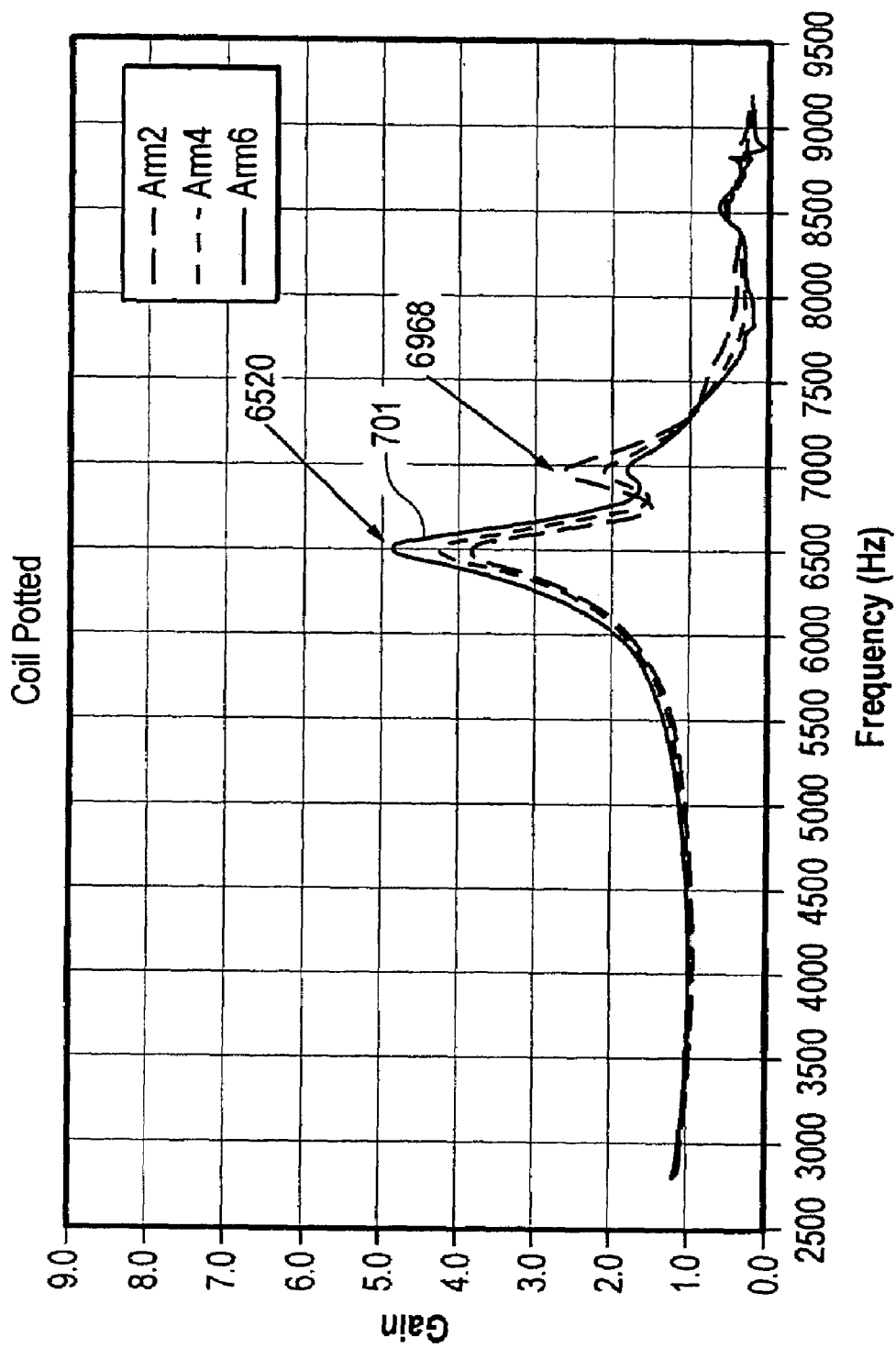
FIG. 7 is a plot of an arm stack assembly low frequency response for a comb and coil assembly constructed in accordance with the present invention.

Referring now to FIGS. 6 and 7, at lower operational frequencies (e.g., 2.8–9.2 kHz), an improvement of about 1 kHz is possible when the entire system is made stiffer by potting the coil 23 (e.g., with adhesive 51) as disclosed herein and by stiffening the pivot 123. Stiffening the coil 23 alone improves the frequency response by about 64 Hz, as shown by comparing plots 601 and 701. But with a stiffened pivot 123, the improvement is about 430 Hz. Further stiffening of the pivot 123 increases the dynamics by a total of about 1.1 kHz. The improvement in dynamics for stiffening the pivot alone is about 592 Hz. Even though stiffening the coil alone has a relatively small improvement in dynamics (64 kHz), when it is combined with a stiffer pivot a total improvement of about 1024 Hz is possible. It has been recognized before that a stiffer pivot is desirable for dynamics.

Figure 8:
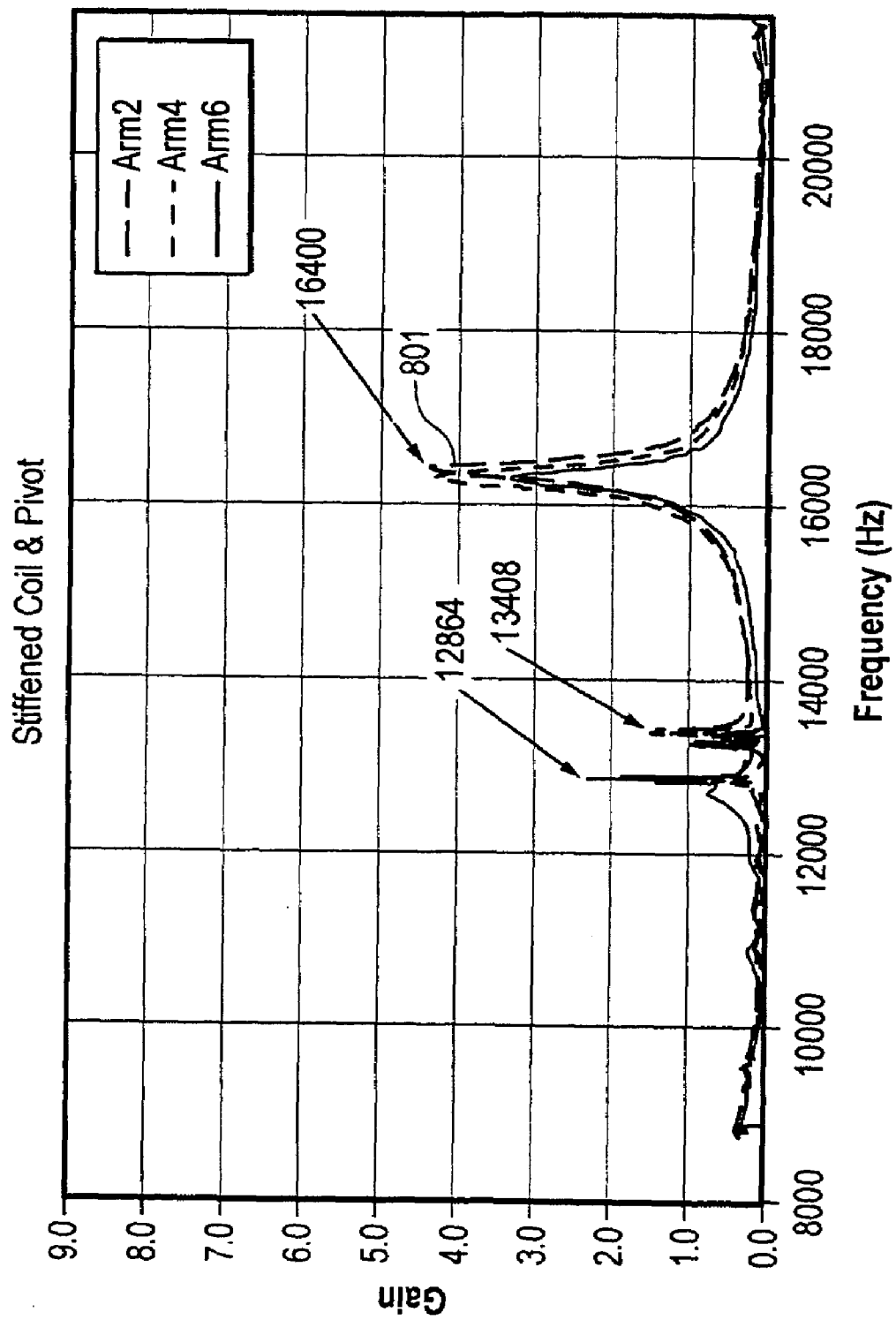
FIG. 8 is a plot of an arm stack assembly high frequency response for a conventional comb and coil assembly.
Figure 9:
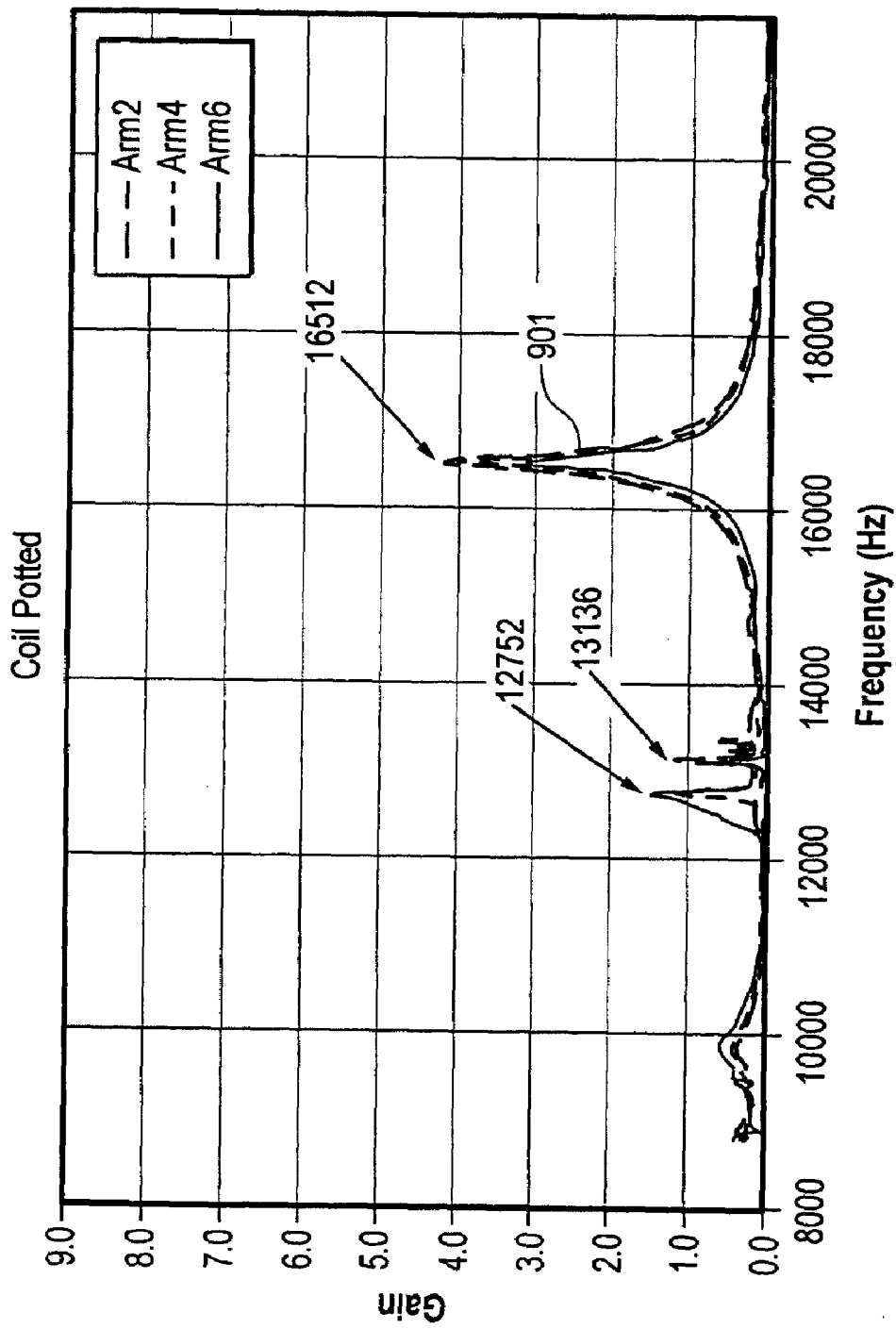
FIG. 9 is a plot of an arm stack assembly high frequency response for a comb and coil assembly constructed in accordance with the present invention.

Referring now to plots 801 and 901 in FIGS. 8 and 9, respectively, a similar trend can be seen at the higher frequencies of about 8.8 to 21.6 kHz. The HSA level data is not as dramatic as the carriage level data. The trend for improvement still exists but is less due to several factors. The mass of an HSA is greater than the carriage with the added Head Gimbal Assemblies (HGA). The HGAs introduce their own modes of vibration that interact with the carriage.

The present invention has several advantages, including the ability to make the coil a structural part of the comb. By eliminating the need for a border of adhesive for attachment, the HSA is lighter with less inertia. Since the coil is pressed against the yoke, the heat transfer out of the coil is metal-to-metal rather than through an adhesive. The dynamic performance of the coil of the present invention is significantly improved over prior art designs.

While the invention has been shown or described in only some of its forms, it should be apparent to those skilled in the art that it is not so limited, but is susceptible to various changes without departing from the scope of the invention. For example, other types of adhesive may be used, such as anaerobic adhesives or those initiated with UV radiation. In addition, a higher viscosity adhesive may be used to provide the same function (e.g., filling voids between the coil and yoke). However, such an embodiment would not operate with capillary action. Rather it would require the squashed coil to be submerged in the adhesive, degassed in a vacuum and typically require a secondary cleaning operation for any excess coating in need of removal.

What is claimed is:

1. A method of stiffening an actuator comb and coil assembly, comprising:
    (a) providing an actuator comb having a yoke with an inner perimeter;
    (b) positioning and registering a coil in the yoke;
    (c) pressing the coil in place in the yoke such that a perimeter of the coil is increased to the inner perimeter and a thickness of the coil is decreased; and
    (d) fusing the coil with the yoke to form a stiffened assembly from the actuator comb and coil.

2. The method of claim 1, wherein step (c) comprises making the thickness of the coil substantially equivalent to the thickness of the yoke.

3. The method of claim 1, wherein step (d) comprises bonding the coil to the yoke with a low viscosity, high $T_g$ adhesive that fills between the coil and the yoke by capillary action.

4. The method of claim 1, wherein step (c) comprises loading the yoke and coil in a tool and then pressing the tool to deform the coil.

5. The method of claim 4, further comprising constraining a back section of the coil that is unsupported by the yoke with the tool to control a final shape of the coil.

6. The method of claim 4, wherein step (d) comprises removing the yoke and coil from the tool before fusing the coil and the yoke.

7. The method of claim 1, wherein step (d) comprises submerging the coil and yoke in adhesive and subsequent degassing the coil and yoke in the adhesive.

8. The method of claim 7, further comprising the steps of further stiffening the stiffened assembly by: providing a pivot that slip fits inside the bore of the actuator comb, applying an adhesive to wick between the pivot and the bore to form a stiff adhesive bond joint therebetween.

9. The method of claim 1, wherein step (a) comprises providing the yoke with a pair of legs extending from the actuator comb, step (b) comprises positioning the coil between the legs of the yoke, and step (c) comprises pressing the coil in between the legs of the yoke.

10. A method of stiffening an actuator comb and coil assembly, comprising:
    (a) providing an actuator comb having a yoke with an inner perimeter;
    (b) positioning and registering a coil in the yoke;
    (c) loading the yoke and coil in a tool and then pressing the tool to deform the coil in place in the yoke such that a perimeter of the coil is increased to the inner perimeter and a thickness of the coil is decreased; and
    (d) fusing the coil with the yoke to form a stiffened assembly from the actuator comb and coil.

11. The method of claim 10, wherein step (d) comprises bonding the coil to the yoke with a low viscosity, high $T_g$ adhesive that fills between the coil and the yoke by capillary action.

12. The method of claim 10, further comprising constraining a back section of the coil that is unsupported by the yoke with the tool to control a final shape of the coil.

13. The method of claim 10, wherein step (d) comprises removing the yoke and coil from the tool before fusing the coil and the yoke.

14. The method of claim 10, wherein step (d) comprises submerging the coil and yoke in adhesive and subsequent degassing the coil and yoke in the adhesive; and further comprising:
    further stiffening the stiffened assembly by: providing a pivot that slip fits inside the bore of the actuator comb, applying an adhesive to wick between the pivot and the bore to form a stiff adhesive bond joint therebetween.

15. The method of claim 10, wherein step (a) comprises providing the yoke with a pair of legs extending from the actuator comb, step (b) comprises positioning the coil between the legs of the yoke, and step (c) comprises pressing the coil in between the legs of the yoke.

16. A method of stiffening an actuator comb and coil assembly, comprising:
    (a) providing an actuator comb having a yoke with an inner perimeter;
    (b) positioning and registering a coil in the yoke;
    (c) pressing the coil in place in the yoke such that a perimeter of the coil is increased to the inner perimeter and a thickness of the coil is decreased; and
    (d) fusing the coil with the yoke to form a stiffened assembly from the actuator comb and coil by submerging the coil and yoke in adhesive and subsequent degassing the coil and yoke in the adhesive.

17. The method of claim 16, wherein step (d) comprises bonding the coil to the yoke with a low viscosity, high $T_g$ adhesive that fills between the coil and the yoke by capillary action.

18. The method of claim 16, wherein:
    step (c) comprises loading the yoke and coil in a tool and then pressing the tool to deform the coil, and constraining a back section of the coil that is unsupported by the yoke with the tool to control a final shape of the coil; and
    step (d) comprises removing the yoke and coil from the tool before fusing the coil and the yoke; and further comprising.

19. The method of claim 16, further comprising the steps of further stiffening the stiffened assembly by: providing a pivot that slip fits inside the bore of the actuator comb, applying an adhesive to wick between the pivot and the bore to form a stiff adhesive bond joint therebetween.

20. The method of claim 16, wherein step (a) comprises providing the yoke with a pair of legs extending from the actuator comb, step (b) comprises positioning the coil between the legs of the yoke, and step (c) comprises pressing the coil in between the legs of the yoke.

* * * * *

UNITED STATES PATENT AND TRADEMARK OFFICE
CERTIFICATE OF CORRECTION

PATENT NO.       : 7,150,094 B2
APPLICATION NO.  : 10/875855
DATED            : December 19, 2006
INVENTOR(S)      : A. David Erpelding It is certified that error appears in the above-identified patent and that said Letters Patent is hereby corrected as shown below:

Col. 8, Ln. 52-53: Delete "; and further comprising"

Signed and Sealed this

Sixth Day of November, 2007

JON W. DUDAS
*Director of the United States Patent and Trademark Office*